(12) United States Patent
Lupoli et al.

(10) Patent No.: US 9,792,624 B2
(45) Date of Patent: *Oct. 17, 2017

(54) NETWORK OF TAGS

(71) Applicant: Motedata Inc., Summerlin, NV (US)

(72) Inventors: Peter Lupoli, Summerlin, NV (US); Jay Kesan, Champaign, IL (US)

(73) Assignee: MOTEDATA INC., Summerlin, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/281,327

(22) Filed: Sep. 30, 2016

(65) Prior Publication Data

US 2017/0018003 A1  Jan. 19, 2017

Related U.S. Application Data

(60) Continuation of application No. 14/922,440, filed on Oct. 26, 2015, now Pat. No. 9,460,446, which is a
(Continued)

(51) Int. Cl.
*H04W 24/00* (2009.01)
*G06Q 30/02* (2012.01)
(Continued)

(52) U.S. Cl.
CPC ........... *G06Q 30/0258* (2013.01); *G06F 8/60* (2013.01); *G06K 7/10366* (2013.01); *G06K 7/10722* (2013.01); *G06K 7/1413* (2013.01); *G06Q 10/107* (2013.01); *G06Q 30/0214* (2013.01); *G06Q 30/0217* (2013.01);
(Continued)

(58) Field of Classification Search
None
See application file for complete search history.

(56) References Cited

U.S. PATENT DOCUMENTS 5,430,644 A * 7/1995 Deaton ............... G06Q 20/042
705/14.25
5,855,007 A * 12/1998 Jovicic ............... G06Q 20/387
705/14.26
(Continued)

*Primary Examiner* — Joseph Feild
*Assistant Examiner* — John Mortell
(74) *Attorney, Agent, or Firm* — John R. Kasha; Kelly L. Kasha; Kasha Law LLC

(57) ABSTRACT

Systems and methods are disclosed for communicating product or service information to a potential purchaser. A product or item describing a service are scanned to obtain both a product or service code and an advertisement promotion code provided by a vendor/retailer or manufacturer of the product or service using a smartphone of a first user. A barcode is generated on the smartphone by combining the product or service code and the advertisement promotion code with information from the smartphone associated with the product or service and with an advertiser code that uniquely identifies the first user. The barcode is communicated to a communication device of a second user that is the potential purchaser of the product or service. When the communication device is presented to a point of sale (POS) terminal, the terminal scans the barcode, decodes the barcode, and compensates the first user according to the advertisement promotion code.

20 Claims, 5 Drawing Sheets

Related U.S. Application Data continuation of application No. 14/585,319, filed on Dec. 30, 2014, now Pat. No. 9,177,325, which is a continuation of application No. 13/595,947, filed on Aug. 27, 2012, now abandoned, which is a continuation-in-part of application No. 12/125,998, filed on May 23, 2008, now Pat. No. 8,558,668, which is a division of application No. 10/952,789, filed on Sep. 30, 2004, now Pat. No. 7,388,488.

(60) Provisional application No. 60/515,449, filed on Oct. 30, 2003.

(51) Int. Cl.
*G08B 13/24* (2006.01)
*G08B 21/22* (2006.01)
*G06F 9/445* (2006.01)
*G06Q 10/10* (2012.01)
*G06Q 50/00* (2012.01)
*H04W 4/00* (2009.01)
*G06K 7/10* (2006.01)
*G06K 7/14* (2006.01)
*G06Q 30/06* (2012.01)

(52) U.S. Cl.
CPC ..... *G06Q 30/0238* (2013.01); *G06Q 30/0267* (2013.01); *G06Q 30/0623* (2013.01); *G06Q 50/01* (2013.01); *G08B 13/2462* (2013.01); *G08B 21/22* (2013.01); *H04W 4/008* (2013.01)

(56) References Cited

U.S. PATENT DOCUMENTS

| | | | | |
|---|---|---|---|---|
| 6,862,575 | B1* | 3/2005 | Anttila | G06Q 30/02 705/14.14 |
| 7,127,261 | B2* | 10/2006 | Van Erlach | G06Q 30/0239 455/41.2 |
| 7,962,369 | B2* | 6/2011 | Rosenberg | G06Q 20/20 705/26.1 |
| 8,260,662 | B2* | 9/2012 | Kaplan | G06Q 30/02 705/14.1 |
| 2003/0163373 | A1* | 8/2003 | Cornateanu | G06Q 30/0225 705/14.26 |
| 2004/0249712 | A1* | 12/2004 | Brown | G06Q 30/02 705/14.19 |
| 2006/0095324 | A1* | 5/2006 | Vergeyle | G06Q 30/02 705/14.38 |
| 2006/0259359 | A1* | 11/2006 | Gogel | G06Q 30/02 705/14.16 |
| 2010/0268592 | A1* | 10/2010 | Shaer | G06Q 30/02 705/14.38 |
| 2014/0006116 | A1* | 1/2014 | Ren | G06Q 30/0207 705/14.3 |

* cited by examiner

NETWORK OF TAGS

CROSS-REFERENCE TO RELATED APPLICATION

This application is a continuation of U.S. patent application Ser. No. 14/922,440, filed Oct. 26, 2015, which is a continuation of U.S. patent application Ser. No. 14/585,319, filed Dec. 30, 2014, now U.S. Pat. No. 9,177,325, which is a continuation of U.S. patent application Ser. No. 13/595,947, filed Aug. 27, 2012, which is a continuation-in-part of U.S. patent application Ser. No. 12/125,998, filed May 23, 2008, now U.S. Pat. No. 8,558,668, which is a divisional of U.S. patent application Ser. No. 10/952,789, filed Sep. 30, 2004, now U.S. Pat. No. 7,388,488, which claims the benefit of U.S. Provisional Patent Application Ser. No. 60/515,449, filed Oct. 30, 2003. All of the above mentioned applications are incorporated by reference herein in their entireties.

INTRODUCTION

The ubiquity and unique features of smartphones has made them useful shopping devices. This is evidenced by the recent adoption of quick response (QR) codes on many goods and advertisements. When these two-dimensional barcodes codes are scanned by the camera of a smartphone, they provide much more information than the universal product code (UPC) barcodes traditionally found on products and used by point of sale (POS) devices. A QR code, for example, can contain a universal resource locator (URL) to additional information about the product or vendor of a product. As a result, when shopping with a smartphone, more information about a product or vendor can instantly be obtained by simply taking a photo of a QR code on the product.

Radio-frequency identification (RFID) tags also have the potential to improve the retail shopping experience. Like QR codes, RFID tags can provide more information about products and their vendors than is currently available. Unfortunately, the unique features of smartphones have not yet been coupled with the capabilities of RFID tags in order to improve the retail shopping experience.

BRIEF DESCRIPTION OF THE DRAWINGS

The skilled artisan will understand that the drawings, described below, are for illustration purposes only. The drawings are not intended to limit the scope of the present teachings in any way.

Figure 1:
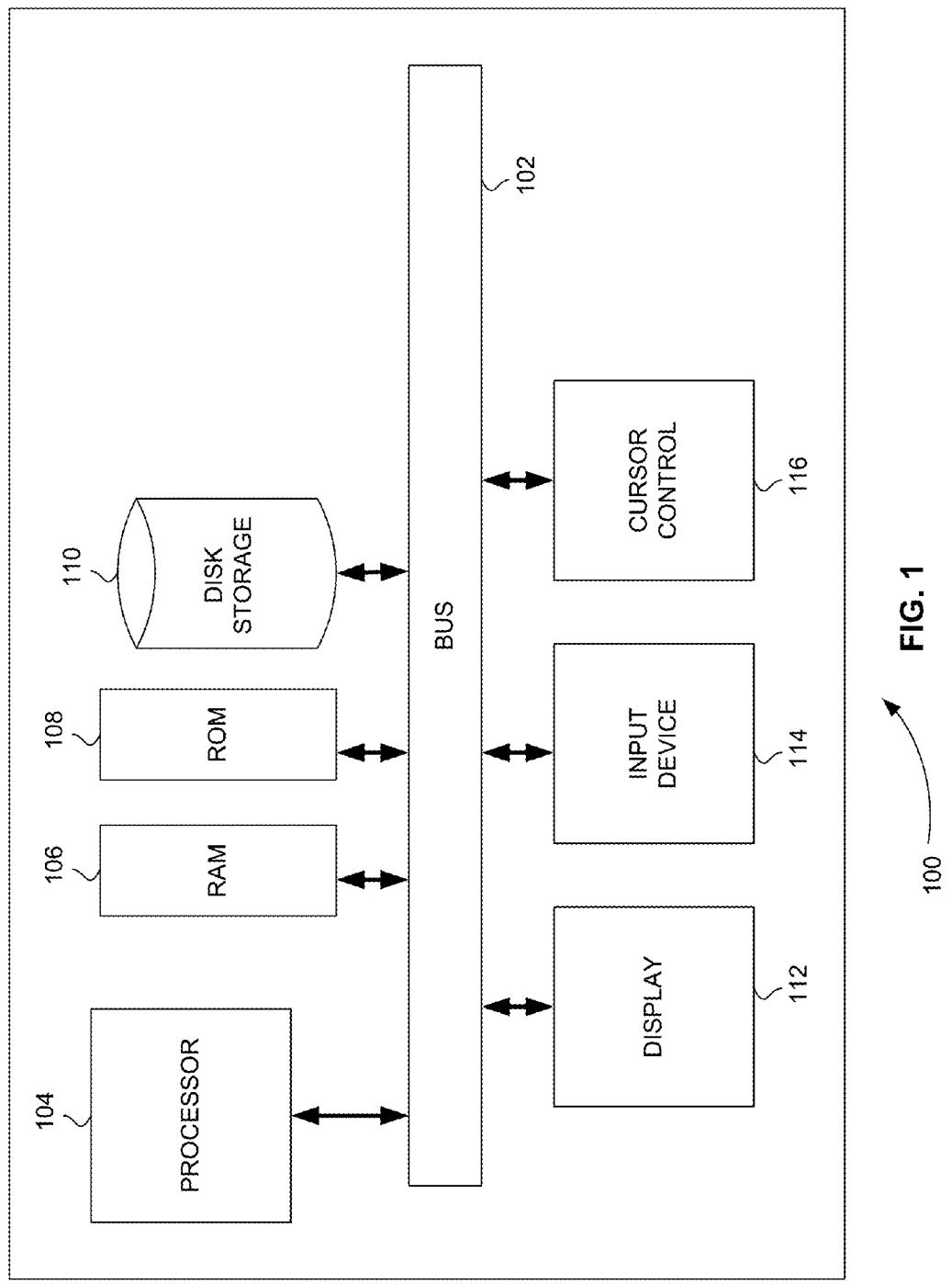
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Network of RFID Tags

As described above, radio-frequency identification (RFID) tags have long had the potential to improve the retail shopping experience. Like quick response (QR) codes, RFID tags can provide more information about products and their vendors than is currently available. Unfortunately, the unique features of smartphones have not yet been coupled with the capabilities of RFID tags or QR codes to improve the retail shopping experience.

Recently, near field communication (NFC) standards have been proposed for smartphones. NFC is a set of standards for smartphones and similar devices to establish radio communication with each other by touching them together or bringing them into close proximity, for example, within a few centimeters. NFC technology enables contactless transactions, data exchange, and simplified setup of more complex communications, such as Wi-Fi. NFC technology makes life easier and more convenient for consumers by making it simpler to make transactions, exchange digital content, and connect electronic devices. These NFC standards, for example, have been discussed and used to transform a smartphone into a payment device like a credit card. These NFC standards cover communications protocols and data exchange formats, and can also be used to communicate with RFID tags.

Embodiments of a method and system are disclosed for communicating product or service information to a potential purchaser using, for example, smartphones and RFID tags or quick response (QR) codes. Further, embodiments of a method and system are disclosed for identifying an advertiser of a product or service using, for example, smartphones and RFID tags or QR codes. A smartphone is described herein for illustrative purposes. One skilled in the art will appreciate that other types of electronic communication devices (hereinafter communication devices) that include a computer system, such as the system shown in FIG. 1, either mobile or non-mobile, can equally be used. In addition to smartphones, other types of communication devices can include, but are not limited to, tablet computers, personal digital assistants, music players, game players, or personal computers. QR codes are described herein for illustrative purposes. One skilled in the art will appreciate other types of codes, such as barcodes, may equally be used.

Figure 2:
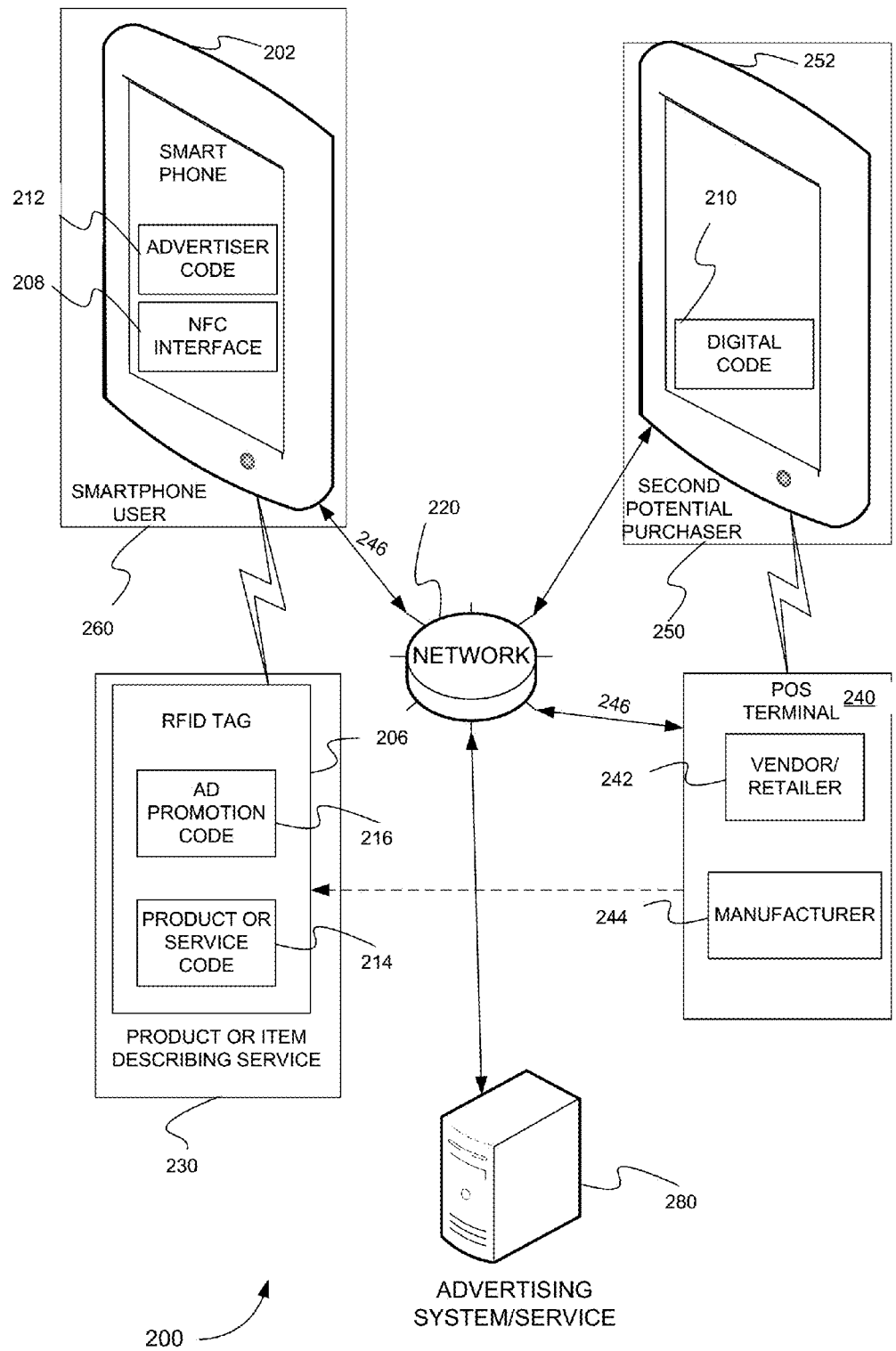
FIG. 2 is a schematic diagram showing a system for communicating product or service information to a potential purchaser and for identifying an advertiser of a product or service, in accordance with various embodiments.

FIG. 2 is a schematic diagram showing a system 200 for communicating product or service information to a potential purchaser and for identifying an advertiser of a product or service, in accordance with various embodiments.

In various embodiments, a computer, such as a server, provides an advertising system/service 280 to generate a product or service code 214 and one or more advertisement promotion codes 216 for a product or service. In various embodiments, a vendor/retailer 242 and/or manufacturer 244 receives product or service code 214 and advertisement promotion codes 216 from advertising system/service 280 through a network 220, for example, and places product or service code 214 and advertisement promotion codes 216 on a RFID or a QR code (hereinafter RFID tag 206) on a product or an item describing a service 230 (hereinafter product or service 230).

Product or service code 214 uniquely identifies product or service 230 and includes or provides detailed information on product or service 230. Product or service code 214 is a UPC, for example. For example, information on a product can include, but is not limited to, price, manufacturer, date of manufacture, technical information, marketing information, vendor information, vendor return policies, technical support phone numbers and/or websites, vendor price comparisons, or comparable products comparisons.

One skilled in art will appreciate that product or service code 214 can be placed on an item describing a service. For example, an RFID tag can be attached to a menu or an entrance of a restaurant and may include a service code that provides menu items of a restaurant, cost of the menu items, food preparation information, nutrition information for each item on the menu, reservation information, seating information, hours of operation, or directions to a restaurant.

Advertisement promotion codes 216 each provides a monetary incentive for a user or advertiser to communicate information about the product or service. An advertisement promotion code 216 uniquely identifies an advertisement promotion for product or service 230. For example, from advertisement promotion code 216, a vendor/retailer 242 or a manufacturer 244 can determine the particular advertising incentive they placed on product or service 230. Each product or service 230 can have more than one advertising incentive or promotion. Therefore, an advertisement promotion code 216 is used to determine the particular promotion.

In various embodiments, advertising system/service 280 provides one or more applications (or apps) that can be downloaded on a smartphone 202 to read RFID tag 206 to access product or service code 214 and advertisement promotion code 216. Note, as described above, smartphone 202 can be any electronic communications device, including, for example, In various embodiments, smartphone 202 with a camera, an NFC interface 208, or radio frequency interface (not shown) can access more information about product or service 230 (and other information), when smartphone 202 is within proximity of product or service 230 that includes RFID tag 206.

In various embodiments, smartphone 202, carried by a smartphone user 260 (also referred to as an advertiser), uses the application provided by advertising system/service 280 to access product or service code 214 on RFID tag 206. As noted above, product or service code 214 includes or provides this product or service information. Alternatively, product or service code 214 may include one or more links, such as URL links, that provide this product or service information.

Information received by smartphone 202 from RFID tags 206 can be coupled with information from smartphone 202, such as an advertiser code 212, the time product or service 230 was seen, the location of product or service 230, and even a photo or digital image of product or service 230 captured by an imaging device (not shown) of smartphone 202. Advertiser code 212 uniquely identifies a person who owns or carries smartphone 202 and advertises product or service 230 to someone else. Advertiser code 212 is used, for example, to determine the person who should be paid for advertising product or service 230. Advertiser code 212 is registered by advertising system/service 280, for example.

All of this information can then be stored on smartphone 202 or shared with others, including one or more potential purchasers 250 in the form of a digital code 210, through a network 220. Digital code 210 may include a barcode or other types of code, for example. The network 220 can be, for example, social networks or traditional communication means, such as email, voice, text, or chat. For example, smartphone 202 can receive the price and product information on a particular laptop (product 230) from an RFID tag 206 on the laptop for sale at a particular retailer 242. The product information can include, for example, the specifications of the laptop, such as the speed of the processor, the disk storage capacity and speed, the size of the monitor, and the type and number of input/output ports. Smartphone 202 can couple this information with the time the laptop was seen, the location of the laptop, and a photo or digital image of the laptop take by the smartphone 202. Smartphone 202 can also do an Internet search for laptops with similar product specifications and can get a price comparison with other vendors. All of this information on the particular laptop 230 can then be stored on smartphone 202 or a remote database (not shown), or shared with others, including one or more potential purchasers 250, using network 220. For example, this information can be sent to a friend or posted on a social networking website.

As noted above, the RFID tag 206 associated with a product or service can include advertisement promotion code 216 that provides a monetary incentive to communicate information about the product or service. In various embodiments, advertisement promotion code 216 may also provide a coupon (not shown) that can be used repeatedly by multiple users. Smartphone 202, for example, can then associate advertisement promotion code 216 of the product or service with the unique code of smartphone user 260 (referred above in FIG. 2 as advertiser code 212), who introduces the product or service to potential purchaser 250 by forwarding the product or service information. Advertisement promotion code 216, product or service code 214, and advertiser code 212 may be combined as digital code 210 when communicated to potential purchaser 250.

In various embodiments, when potential purchaser 250 (now a purchaser) presents digital code 210 to vendor/retailer 242 at the time of purchase, a point of sale (POS) terminal or device 240 scans and decodes digital code 210 into product or service code 214 that identifies the specific product or service, advertisement promotion code 216 that identifies the advertising promotion including the compensation for advertising the product or service, and advertiser code 212 that identifies smartphone user 260 that forwarded the product or service information. One skilled in the art will appreciate that POS terminal or device 240 can be any computing device, mobile or non-mobile, that is capable of scanning and decoding digital code 210 using, for example, an application provided by advertising system/service 280.

In various embodiments, potential purchaser 250 presents digital code 210 at the time of purchase using a communications device 252, such as a smartphone, and an application (or app) provided by advertising system/service 280, for example. For example, potential purchaser 250 presents digital code 210 by displaying a code that can be scanned by POS terminal or device 240, by sending the code through network 220 to POS terminal or device 240, or sending a RF or NFC to POS terminal or device 240

In various embodiments, advertisement promotion code 216 included within digital code 210 specifies how smartphone user 260 is compensated for communicating product or service information to potential purchaser 250. For example, smartphone user 260 may be compensated by vendor/retailer 242 and/or manufacturer 244 of the product or service by receiving a credit message or coupon 246. Alternatively, vendor/retailer 242 and/or manufacturer 244 may store a credit for smartphone user 260 in an internal database to be used by smartphone user 260 when making a future purchase from vendor/retailer 242 and/or manufacturer 244. Vendor/retailer 242 and/or manufacturer 244 may also send a message to advertising system/service 280 instructing advertising system/service 280 to store a credit or coupon for smartphone user 260. Smartphone user 260 is identified on advertising system/service 280 using advertiser code 212, for example.

Figure 3:
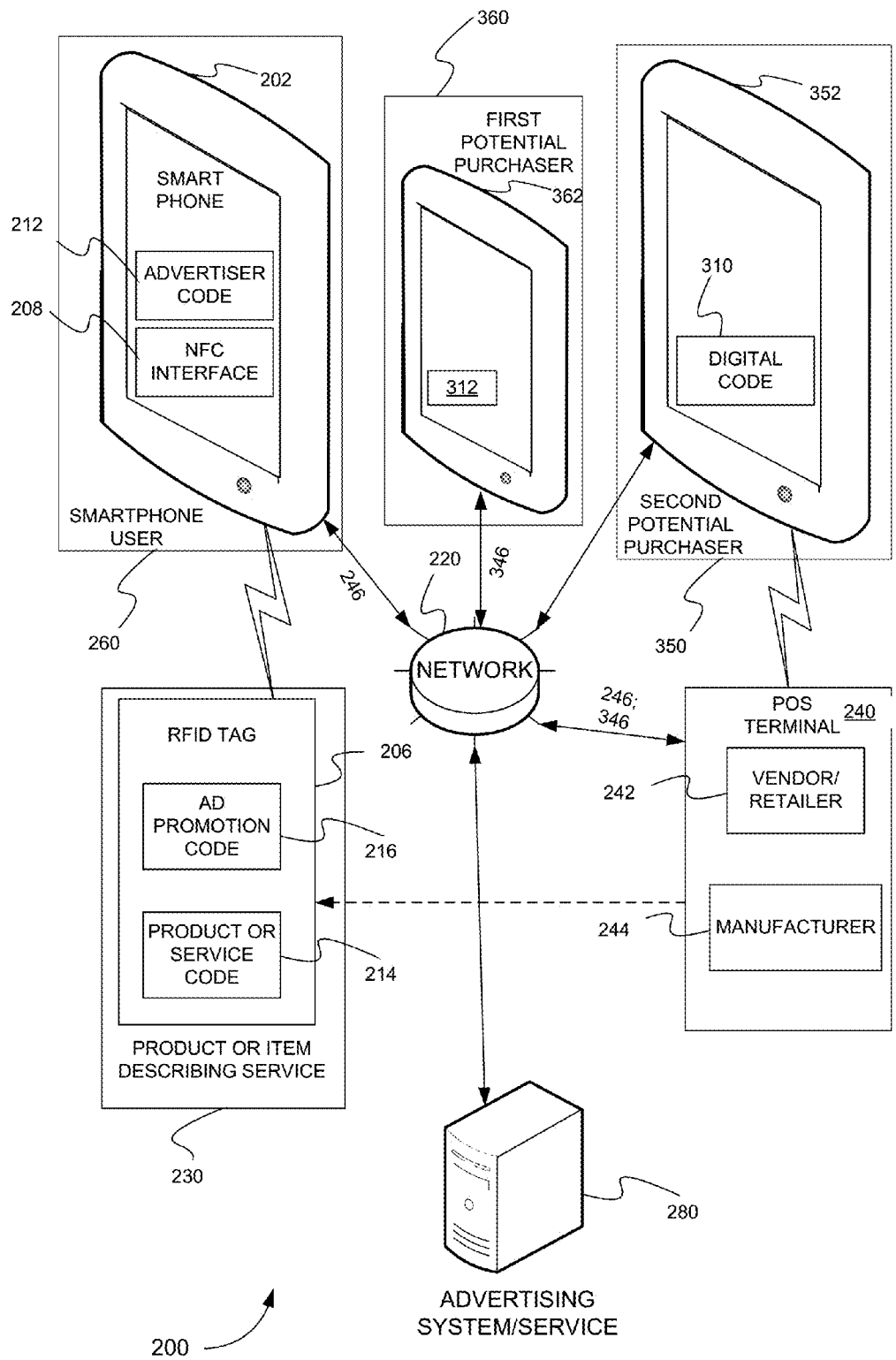
FIG. 3 is a schematic diagram showing a system for identifying and compensating one or more advertisers of a product or service, in accordance with various embodiments.

FIG. 3 is a schematic diagram showing a system 300 for identifying and compensating one or more advertisers of a product or service, in accordance with various embodiments.

In various embodiments, two or more users who forward information on product or service 230 can be compensated using advertising system/service 280. For example, smartphone user 260 forwards product or service code 214 and the advertisement promotion code 216 provided on RFID tag 206 of product or service 230 to a smartphone 362 of a first potential purchaser 360. The forwarded information is associated with advertiser code 212 of smartphone user 260. The first potential purchaser 360 may send the forwarded information (including product or service code 214, advertisement promotion code 216, advertiser code 212 of smartphone user 260) and another advertiser code 312 of first potential purchaser 360 to a smartphone 352 of a second potential purchaser 350 in the form of a digital code 310. When second potential purchaser 350 presents digital code 310 at the time of purchase, digital code 310 may be decoded into product or service code 214 that identifies the specific product or service, and advertiser code 212 of smartphone user 260 and advertiser code 312 of first potential purchaser 360. Smartphone user 260 and first potential purchaser 360 may each receive a credit message or coupon 246 and 346, respectively, from vendor/retailer 242 and/or manufacturer 244 of the product or service, according to a preset percentage of the profit margin of the product or service specified by advertisement promotion code 216, for example. For example, vendor/retailer 242 and/or manufacturer 244 may send a message to advertising system/service 280 to store a credit or coupon for smartphone user 260 and first potential purchaser 360. Again, advertising system/service 280 identifies smartphone user 260 and first potential purchaser 360 using advertiser codes 212 and 312, respectively.

FIGS. 2 and 3 are described with respect to an RFID tag 206. One skilled in the art will appreciate that a QR code and/or barcode associated with a product or service can equally be used to provide an advertising code that provides a monetary incentive to communicate information about the product or service.

In contrast to QR codes or barcodes, RFID tags can be active devices. In other words, they can constantly broadcast their information. This unique feature allows point of sale (POS) devices to tally the prices of all of the items in a shopping cart almost instantaneously, for example. Depending on the distances over which RFID tags broadcast their messages, however, this active capability of the tags can cause problems when browsing products in close proximity to many other products.

In various embodiments, smartphone 202 includes a filtering mechanism that allows smartphone user 260 to select the products or services he or she is currently interested in. This allows smartphone 202 to only notify its user when selected products and services are nearby. Smartphone 202 can also block or not receive transmissions from the RFID tags of products or services a smartphone user 260 has not selected.

In various embodiments, smartphone user 260 is offered a list of available products or services that are nearby having RFID tags that broadcast messages. When smartphone user 260 deselects one or more products or services using a user interface on smartphone 202, this selection is stored in the smartphone's memory device. The next time smartphone 202 receives messages from the one or more deselected products or services, smartphone 202 will not show these messages to smartphone user 260. Alternatively, smartphone 202 will show these messages in a different color or shade to smartphone user 260 until smartphone user 260 actively selects these messages to reactivate message alert functionalities.

Figure 4:
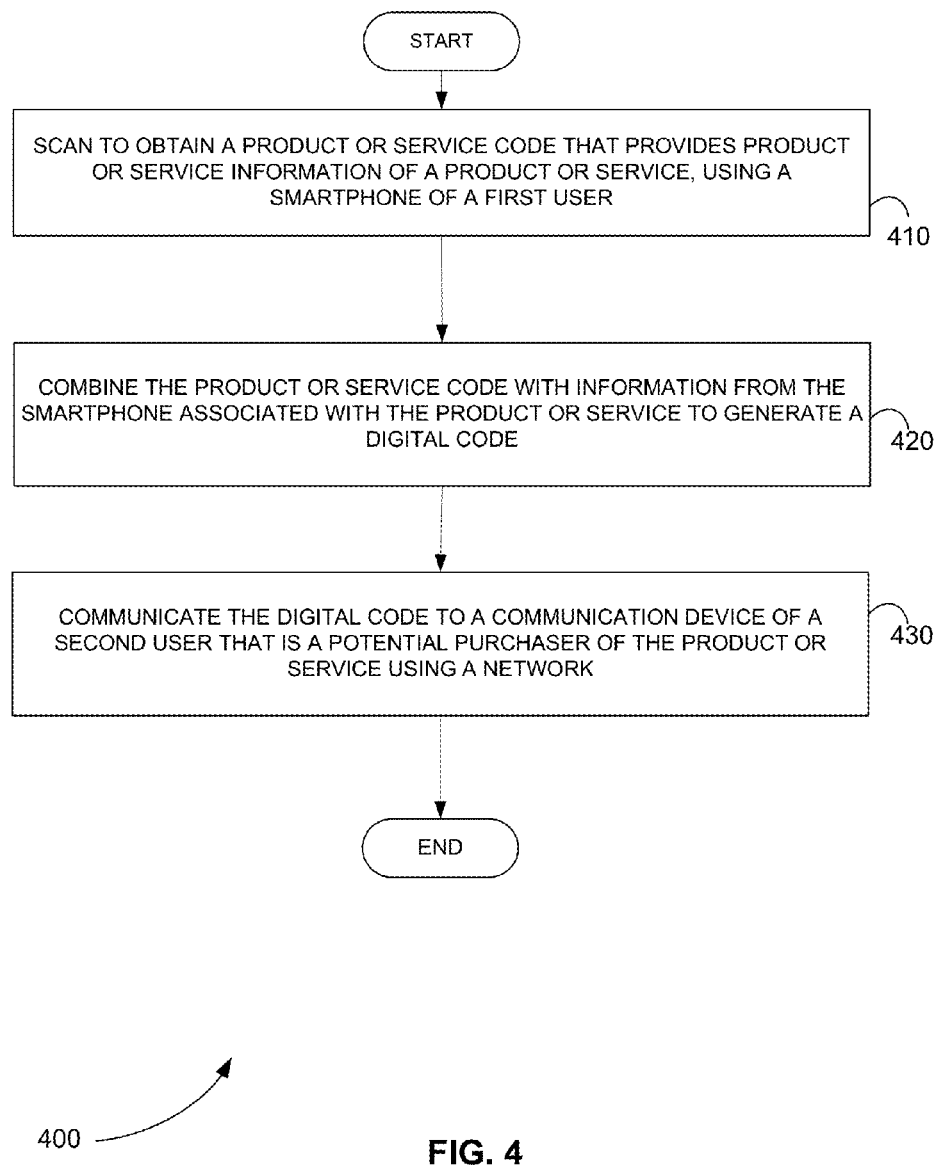
FIG. 4 is an exemplary flowchart showing a method for communicating product or service information to a potential purchaser, in accordance with various embodiments.

FIG. 4 is an exemplary flowchart showing a method for communicating product or service information to a potential purchaser, in accordance with various embodiments.

In step 410, a smartphone of a first user scans a product or item describing a product to obtain a product or service code that provides product or service information of a product or service.

In step 420, the product or service code is combined with information from the smartphone associated with the product or service to generate a digital code.

In step 430, the digital code is communicated to a communication device of a second user that is the potential purchaser of the product or service using a network.

In various embodiments, the scanning step 410 includes scanning a radio frequency identification (RFID) tag.

In various embodiments, the scanning step 410 includes using a near field communication (NFC) interface on the smartphone to access information on the product or service.

In various embodiments, the method 400 further includes filtering, using a filtering mechanism, unselected products or services by the first user so that the first user is only notified when selected products or services are nearby.

In various embodiments, the filtering step includes blocking transmissions from RFID tags of products or services the first user has not selected.

In various embodiments, the method 400 further includes showing messages from the unselected products or services in a different color or shade until the first user actively selects the messages from the unselected products or services.

In various embodiments, the scanning step 410 includes scanning a barcode or QR code.

In various embodiments, the method 400 further includes capturing a photo or digital image of the product or service, using an imaging device on the smartphone.

In various embodiments, the information from the smartphone includes one or more of the time the product or service was seen, the location of the product or service, and the digital image of the product or service.

In various embodiments, the communicating step 420 includes posting the digital code on a social networking website.

In various embodiments, the communicating step 420 includes sending the digital code using communication channels including one or more of an email, voice, text, and chat.

In various embodiments, the product or service code provides the product or service information by including one or more universal resource locator (URL) links that provide the product or service information.

In various embodiments, the product or service code is a product code, and the product or service information includes one or more of a price, manufacturer, date of manufacture, technical information, marketing information, vendor information, vendor return policies, technical support phone numbers and/or websites, vendor price comparisons, and comparable products comparisons.

In various embodiments, the product or service code is a service code that provides information on services available and includes one or more of menu items of a restaurant, cost of the menu items, food preparation information, nutrition information for each item on the menu, reservation information, seating information, hours of operation, and directions to the restaurant.

In various embodiments, the digital code further includes an advertisement promotion code that describes an incentive for communicating information about the product or service, and one or more advertiser codes that identify one or more advertisers that forwarded the information about the product or service to the potential purchaser. The first user is one of the one or more advertisers.

In various embodiments, the method 400 further includes communicating the digital code to a point of sale device or terminal using the communication device. The point of sale device receives the digital code from a purchaser that is the second user, decodes the digital code into the product or service code, the advertisement promotion code, and the advertiser codes, and compensates the one or more advertisers according to the incentive described in the advertisement promotion code, after the purchaser makes a purchase.

In various embodiments, the compensating step includes sending the one or more advertisers one or more emails attaching one or more credit vouchers or coupons for future purchases.

In various embodiments, the compensating step includes storing a credit for each of the one or more advertisers in a database of a vendor/retailer or manufacturer for future purchases.

System

Referring again to FIGS. 2 and 3, a system for communicating product or service information to a potential purchaser includes a smartphone of a first user that scans a product or item describing a product to obtain a product or service code that provides product or service information of a product or service. The smartphone combines the product or service code with information from the smartphone associated with the product or service to generate a digital code. Further, the smartphone communicates the digital code to a communication device of a second user that is the potential purchaser of the product or service using a network.

Computer Program Product

In various embodiments, a computer program product includes a non-transitory and tangible computer-readable storage medium whose contents include a program with instructions being executed on a processor so as to perform a method for communicating product or service information to a potential purchaser. This method is performed by a system that includes one or more distinct software modules.

Figure 5:
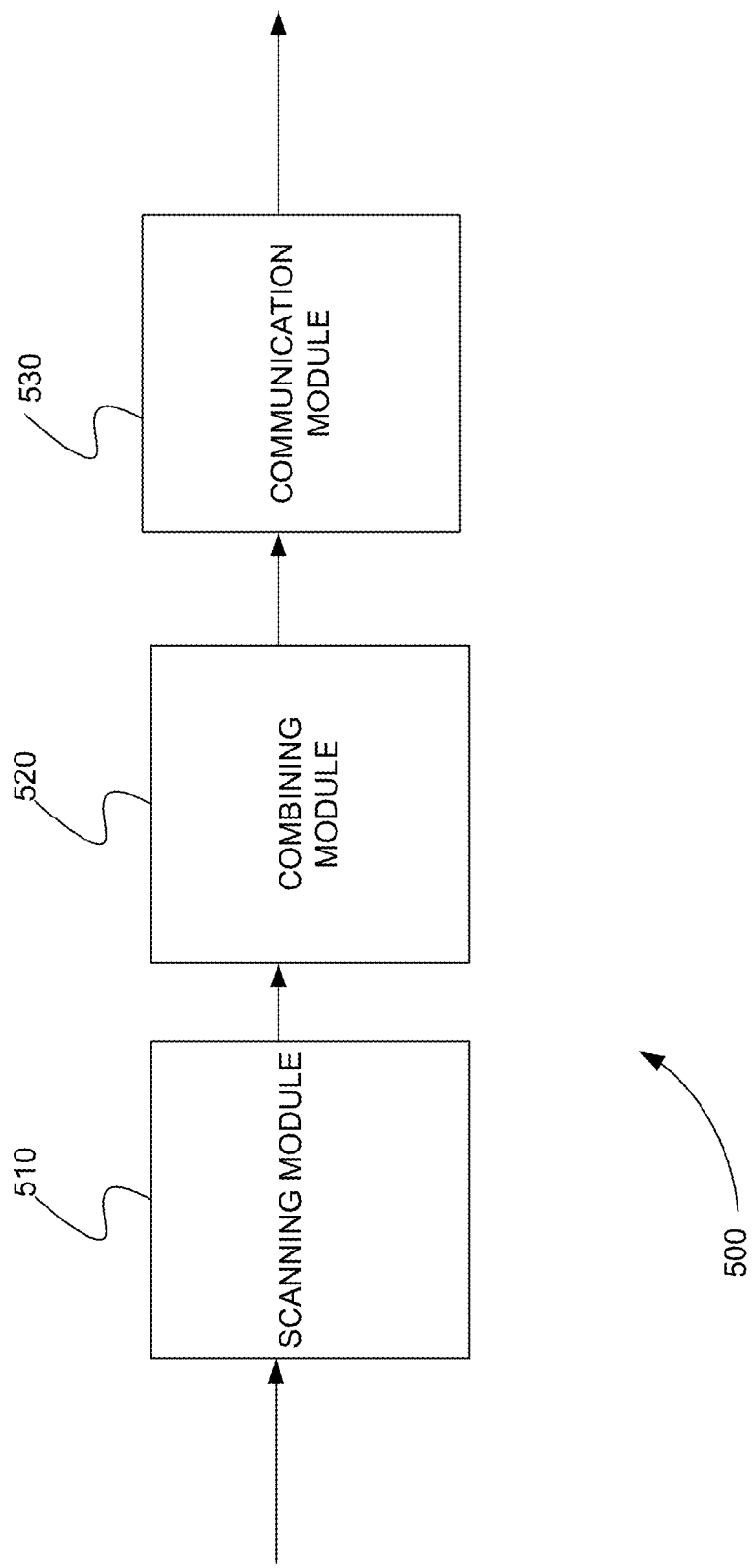
FIG. 5 is a schematic diagram of a system that includes one or more distinct software modules that perform a method for communicating product or service information to a potential purchaser, in accordance with various embodiments.

FIG. 5 is a schematic diagram of a system 500 that includes one or more distinct software modules that perform a method for communicating product or service information to a potential purchaser, in accordance with various embodiments. System 500 includes scanning module 510, combining module 520, and communication module 530.

In various embodiments, the scanning module 510 scans to obtain a product or service code that provides product or service information of a product or service, using a smartphone of a first user.

In various embodiments, the combining module 520 combines the product or service code with information from the smartphone associated with the product or service to generate a digital code.

In various embodiments, the communication module 530 communicates the digital code to a communication device of a second user that is the potential purchaser of the product or service using a network.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for communicating product or service information to a potential purchaser, comprising:

scanning, using an application downloaded from a server to a smartphone of a first user, a product or an item describing a service to obtain both a product or service code and an advertisement promotion code, wherein the product or service code provides information about a product or service, and wherein the advertisement promotion code provides a monetary incentive for the first user to communicate the information about the product or service, wherein the application registers the first user with an advertiser code that uniquely identifies the first user;

generating a barcode, using the application on the smartphone of the first user, by combining 1) the product or service code, 2) the advertisement promotion code, and 3) the advertiser code of the first user, wherein 1) the product or service code, 2) the advertisement promotion code, and 3) the advertiser code of the first user are encoded in the barcode; and communicating the barcode to a communication device of a second user that is the potential purchaser of the product or service using a network, using the application on the smartphone of the first user, wherein the communication device of the second user downloads a second application to receive the barcode, and wherein when the communication device of the second user is presented to a point of sale (POS) terminal, the POS terminal scans the barcode on the communication device of the second user, decodes, using the second application on the communication device of the second user, the barcode into 1) the product or service code, 2) the advertisement promotion code, and 3) the advertiser code of the first user, and compensates the first user identified by the advertiser code according to the incentive described in the advertisement promotion code, after the second user purchases the product or service.

2. The method of claim 1, wherein the scanning step comprises scanning a radio frequency identification (RFID) tag.

3. The method of claim 2, wherein the scanning step further comprises using a near field communication (NFC) interface on the smartphone to access information on the product or service.

4. The method of claim 3, further comprising filtering, using a filtering mechanism, unselecting products or services by the first user so that the first user is only notified when selected products or services are nearby.

5. The method of claim 4, wherein the filtering step includes blocking transmissions from RFID tags of products or services the first user has not selected.

6. The method of claim 4, further comprising showing messages from the unselected products or services in a different color or shade until the first user actively selects the messages from the unselected products or services.

7. The method of claim 1, wherein the scanning step comprises scanning a barcode or QR code.

8. The method of claim 1, further comprising capturing a photo or digital image of the product or service, using an imaging device on the smartphone.

9. The method of claim 8, wherein the information from the smartphone includes one or more of the time the product or service was seen, the location of the product or service, and the digital image of the product or service.

10. The method of claim 1, wherein the communicating step comprises posting the barcode on a social networking website.

11. The method of claim 1, wherein the communicating step comprises sending the barcode using communication channels including one or more of an email, voice, text, and chat.

12. The method of claim 1, wherein the product or service code provides the product or service information by including one or more universal resource locator (URL) links that provide the product or service information.

13. The method of claim 1, wherein the product or service code is a product code, and wherein the product or service information includes one or more of a price, manufacturer, date of manufacture, technical information, marketing information, vendor information, vendor return policies, technical support phone numbers and/or websites, vendor price comparisons, and comparable products comparisons.

14. The method of claim 1, wherein the product or service code is a service code that provides information on services available and includes one or more of menu items of a restaurant, cost of the menu items, food preparation information, nutrition information for each item on the menu, reservation information, seating information, hours of operation, and directions to the restaurant.

15. The method of claim 1, wherein the compensating step includes sending the first user an email attaching one or more credit vouchers or coupons for future purchases.

16. The method of claim 1, wherein the compensating step includes storing a credit for the first user in a database of a vendor/retailer or manufacturer for future purchases.

17. A system for communicating product or service information to a potential purchaser, comprising:
   a smartphone of a first user that
      scans, using an application downloaded from a server, wherein the application allows the smartphone of the first user to scan a product or item describing a service a product to obtain both a product or service code and an advertisement promotion code, wherein the product or service code provides information about a product or service, and wherein the advertisement promotion code provides a monetary incentive for the first user to communicate the information about the product or service, wherein the application registers the first user with an advertiser code that uniquely identifies the first user,
      generates a bar code, using the application on the smartphone of the first user, by combining 1) the product or service code, 2) the advertisement promotion code, and 3) the advertiser code of the first user, wherein 1) the product or service code, tithe advertisement promotion code, and 3) the advertiser code of the first user are encoded in the barcode,
      communicates the barcode to a communication device of a second user that is the potential purchaser of the product or service using a network, using the application on the smartphone of the first user, wherein the communication device of the second user downloads a second application to receive the barcode, and wherein when the communication device of the second user is presented to a point of sale (POS) terminal, the POS terminal scans the barcode on the communication device of the second user,
decodes, using the second application on the communication device of the second user, the barcode into 1) the product or service code, 2) the advertisement promotion code, and 3) the advertiser code of the first user, and
compensates the first user identified by the advertiser code according to the incentive described in the advertisement promotion code, after the second user purchases the product or service.

18. The system of claim 17, wherein the compensating step includes storing a credit for the first user in a database of a vendor/retailer or manufacturer for future purchases.

19. An advertising system to providing incentives and compensation to a user of a smartphone to communicating product or service information to a potential purchaser, the method comprising:
   an advertising system computer server that
      generates 1) a product or service code for identifying a product or service and 2) an advertisement promotion code that provides a monetary incentive for a first user to communicate information about the product or service,
      allows 1) the product or service code and 2) the advertisement promotion code to be placed in an RFID or a QR code on the product or an item describing the service,
      sends an application to a smartphone of a first user, wherein the application that is downloaded on the smartphone registers the first user with 3) an advertiser code that uniquely identifies the first user, wherein the first user uses the application that is downloaded on the smartphone of the first user to scan the RFID or a QR code on the product or an item describing the service and wherein the smartphone
      generates a barcode, using the application, by combining 1) the product or service code, 2) the advertisement promotion code, and 3) the advertiser code of the first user, wherein 1) the product or service code, 2) the advertisement promotion code, and 3) the advertiser code of the first user are encoded in the barcode, and
      communicates the barcode to a communication device of a second user that is the potential purchaser of the product or service using a network, using the application on the smartphone of the first user, wherein the communication device of the second user downloads a second application to receive the barcode, and wherein when the communication device of the second user is presented to a point of sale (POS) terminal and the POS terminal scans the barcode on the communication device of the second user and decodes, using the second application on the communication device, the barcode into 1) the product or service code, 2) the advertisement promotion code, and 3) the advertiser code of the first user, after the second user purchases the product or service,
      receives 1) the product or service code, 2) the advertisement promotion code, and 3) the advertiser code from a point of sale terminal, and
      compensates the first user identified by the advertiser code according to the incentive described in the advertisement promotion code for the second users purchase of the product or service identified by the product or service code.

20. The system of claim 19, wherein the compensating step includes sending the first user an email attaching one or more credit vouchers or coupons for future purchases.

\* \* \* \* \*